United States Patent [19]

Galbraith

[11] 3,990,328
[45] Nov. 9, 1976

[54] INFINITELY VARIABLE SPEED DRIVE MECHANISM

[76] Inventor: Peter Afton Galbraith, 9 Montreal Road, West Midland, Australia

[22] Filed: Apr. 14, 1975

[21] Appl. No.: 567,996

Related U.S. Application Data

[63] Continuation-in-part of Ser. No. 394,413 Sept. 5, 1973.

[30] Foreign Application Priority Data

Sept. 5, 1972 Australia.............................. 330/72

[52] U.S. Cl..................................... 74/796; 74/199
[51] Int. Cl.[2].................... F16H 15/50; F16H 15/08
[58] Field of Search...................... 74/793, 796, 199

[56] References Cited
UNITED STATES PATENTS

| | | | |
|---|---|---|---|
| 2,841,019 | 7/1958 | Beier.................................. | 74/199 |
| 2,849,885 | 9/1958 | Beier.................................. | 74/199 |
| 2,881,622 | 4/1959 | Kraus.................................. | 74/199 |
| 2,939,345 | 6/1960 | Burns.................................. | 74/199 |
| 3,006,206 | 10/1961 | Kelley et al......................... | 74/199 |
| 3,099,927 | 8/1963 | Anderson............................ | 74/796 |
| 3,181,381 | 5/1965 | Jorgensen........................... | 74/199 |
| 3,203,280 | 8/1965 | Kirshey............................... | 74/796 |
| 3,490,313 | 1/1970 | Astrov et al......................... | 74/199 |
| 3,765,257 | 10/1973 | Ogino.................................. | 74/199 |

*Primary Examiner*—Leonard H. Gerin
*Attorney, Agent, or Firm*—Ulle C. Linton

[57] ABSTRACT

An infinitely variable speed drive mechanism comprising a pair of sun discs mounted on a first shaft for rotation therewith and at least one of said discs being capable of limited axial movement along the shaft and being loaded towards each other, a plurality of planet discs each rotatably mounted on one end of a corresponding arm or fork for rotation about an axis substantially parallel to said first shaft, the other end of each arm or fork being pivotally mounted on a carrier member for movement about an axis substantially parallel to said first shaft said planet discs moving in a plane normal to the axis of rotation and being capable of limited sliding movement along their axis of rotation so that at all times they remain substantially normal to the axis of rotation, said carrier being mounted on a second shaft for rotation therewith about an axis coaxial with the axis of rotation of said first shaft, a pair of spaced non rotating annular members substantially coplanar with and concentric with said sun discs, the inner periphery of said annular members and the outer periphery of said sun discs embracing and frictionally engaging said planet discs and means for varying the radial position of said planet discs with respect to said annular members and said sun discs.

9 Claims, 9 Drawing Figures

INFINITELY VARIABLE SPEED DRIVE MECHANISM

This invention relates to an infinitely variable speed drive mechanism and is a continuation in part of Application Ser. No. 394413 filed Sept. 5, 1973.

The object of the invention is to provide an infinitely variable speed drive mechanism, which is relatively simple in construction and operation and which may be coupled with one or more epicyclic gear trains for a wide variety of applications.

It has been found that a suitable drive can be provided by means of an epicyclic friction drive in which the planet members are of a conical configuration and frictionally engage mating faces on the annular members and the sun members, the position of the planet members relative to the other members being varied to provide the desired velocity ratio between input and output shafts.

Thus in one form the invention resides in an infinitely variable speed drive mechanism comprising a pair of sun discs mounted on a first shaft for rotation therewith and capable of limited axis movement along the shaft and being forced towards each other, a plurality of planet discs each rotatably mounted on one end of a corresponding arm or fork for rotation about an axis substantially parallel to said first shaft, the other end of each arm or fork being pivotally mounted on a carrier member for movement about an axis substantially parallel to said first shaft, said planet discs moving in a plane normal to the axis of rotation and being capable of limited sliding movement along their axis of rotation so that at all times they remain substantially normal to the axis of rotation, said carrier being mounted on a second shaft for rotation therewith about an axis coaxial with the axis of rotation of said first shaft, a pair of spaced non rotating annular members substantially coplanar with and concentric with said sun discs, the inner periphery of said annular members and the outer periphery of said sun discs embracing and frictionally engaging said planet discs and means for varying the radial position of said planet discs with respect to said annular members and said sun discs.

Preferably both faces of the planet discs are conical and the inner periphery of the annular members and the outer periphery of the sun discs are provided with inwardly projecting lips, the outer faces of which are part conical or part toroidal to mate with the faces of said planet discs.

The invention will be better understood by reference to the following description of the specific embodiments shown in the accompanying drawings wherein.

Figure 6:
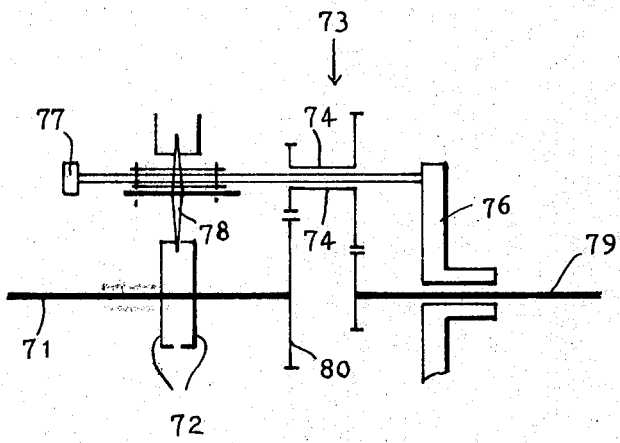
Figure 7:
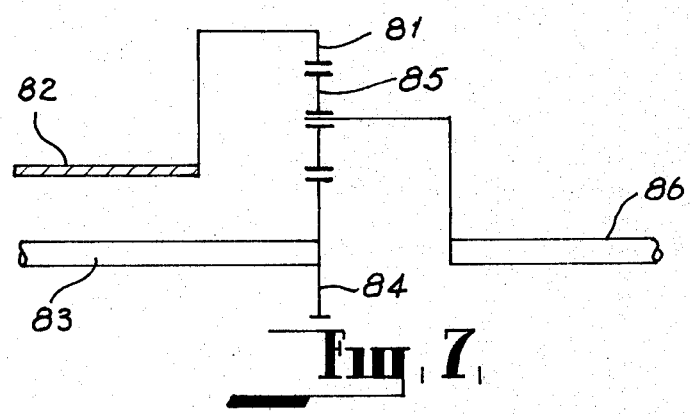
Figure 8:
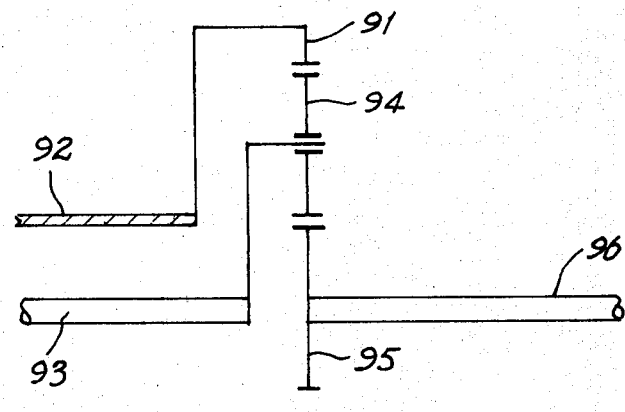
Figure 9:
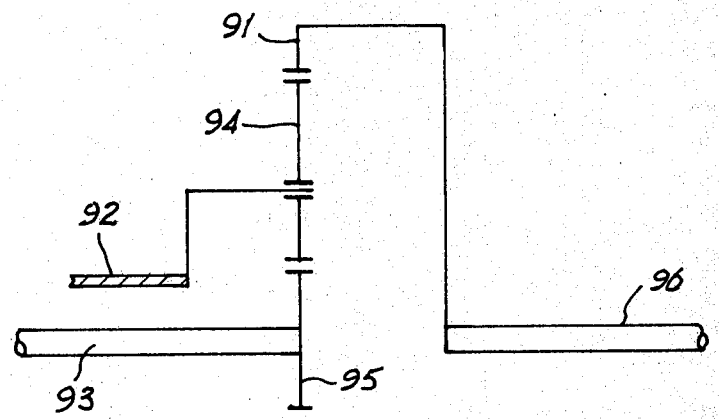

FIG. 6 is a schematic illustration of the variable speed drive of the present invention combined with an epicyclic gear system to provide a unit in which the speed of the input shaft is infinitely variable over a limited range at a speed above the input speed; and FIGS. 7, 8 and 9 each illustrate diagrammatically possible arrangements of the speed drive mechanism of the present invention with conventional single stage epicyclic gear trains.

Figure 1:
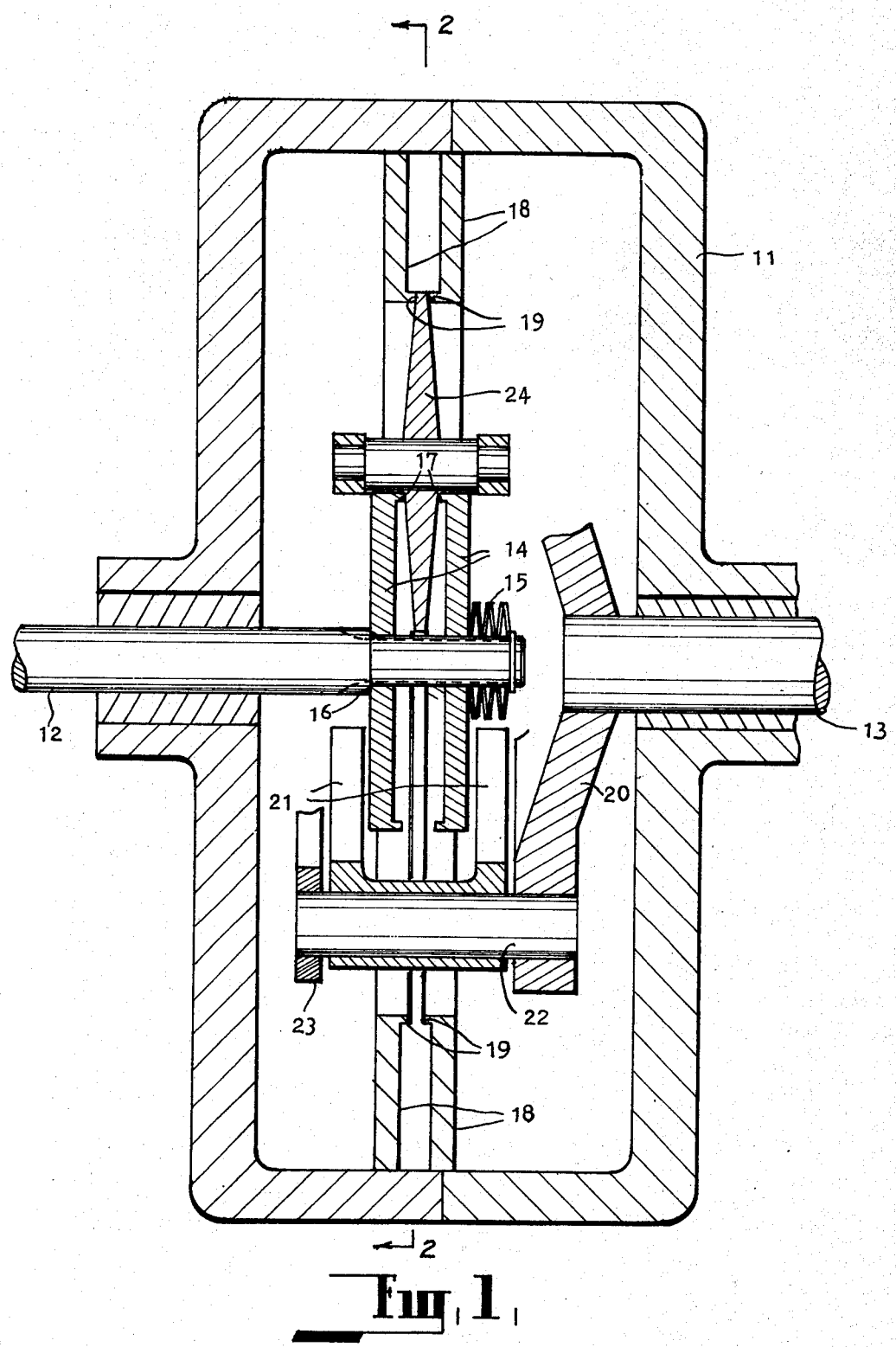
FIG. 1 is a sectional view of one embodiment.
Figure 2:
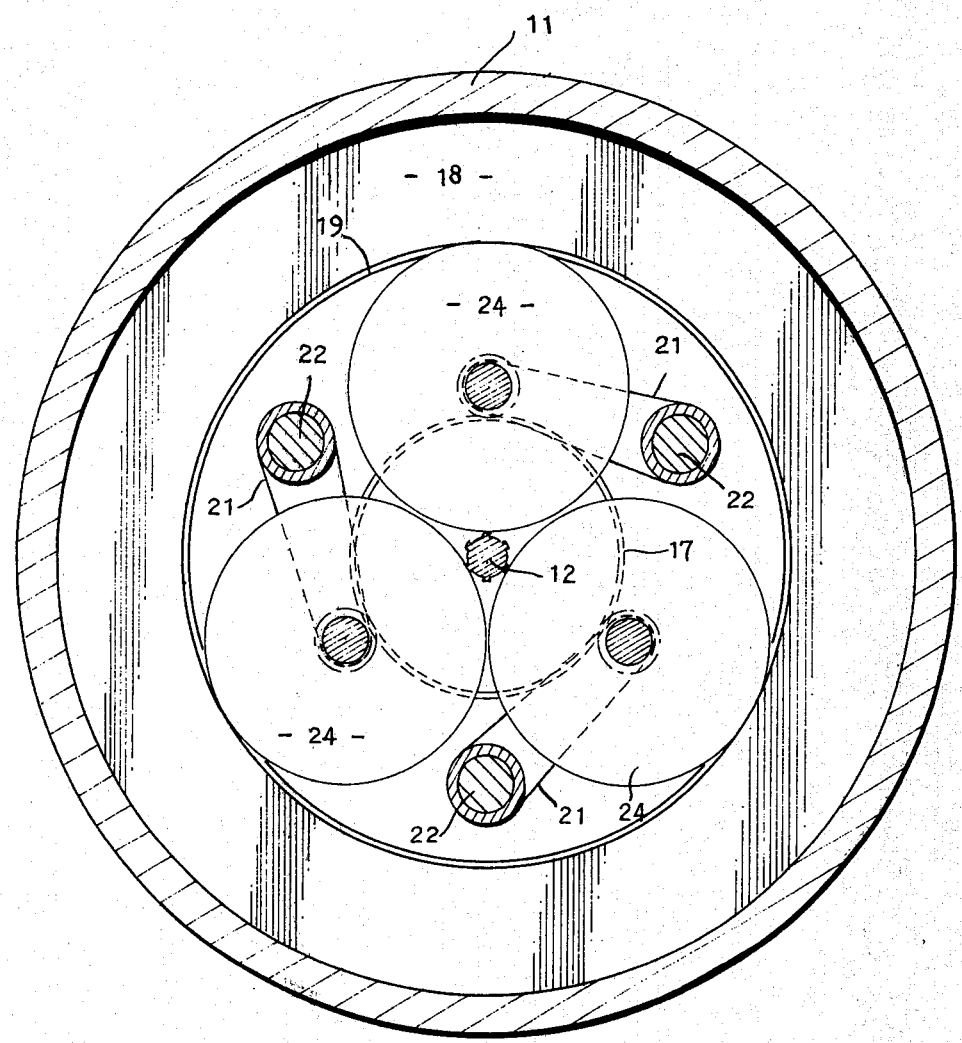
FIG. 2 is a part sectional on line 2—2 of FIG. 1.

Referring now to the embodiment shown in FIGS. 1 and 2 of the drawings, the mechanism is housed in a suitable casing or housing 11 which is substantially cylindrical. A first or drive shaft 12 is rotatably mounted in suitable bearings at one end of the casing whilst a second or driven or output shaft 13 is rotatably mounted in suitable bearings in the other end of the casing coaxial with the first or drive shaft 12. The inner end of the drive shaft 12 is splined and a pair of sun discs 14 are slidably mounted thereon. The sun discs are forced towards each other by means of a spring 15 mounted on the inner end of the drive shaft 12 and urging the sun discs towards a shoulder 16 on the drive shaft 12. If desired the spring may be replaced by a torque sensitive axial loading device. The outer periphery of each sun disc is provided with inwardly directed lips 17, the outer face of each lip being part conical or part toroidal. A pair of spaced annular members 18 are mounted on the inside of the casing substantially coplanar with said sun discs. The inner periphery of each of the annular members is provided with an inwardly directed lip 19, the outer face of which is partly conical or part toroidal and concentric with the input shaft 12. The annular members are fixed so that they do not rotate but are capable of limited sliding movement towards or away from each other in a direction parallel to the axis of the input shaft 12. The movement of the annular members towards or away from each other may be effected through mechanical means such as a screw thread or pneumatic or hydraulic means (not shown). A carrier member 20 in the form of a large disc is mounted on the inner end of the output shaft 13 within the casing 11 to rotate with said shaft. One end of each of three forks or arms 21 is pivotally mounted on a projecting shaft 22 at spaced intervals around the carrier member 20 for limited swinging movement about an axis parallel to the axis of rotation of the drive shaft 12 and the output shaft 13. The end of each of the shafts 22 remote from the carrier member 20 is supported in a ring member 23 rotatably mounted within the housing for rotation about an axis coaxial with the axis of rotation of the carrier member. A planet disc 24 is rotatably mounted on the other end of each fork or arm 21 for rotation about an axis parallel to the axis of rotation of the drive shaft 12 and the output shaft 13. Both faces of each disc 24 are located so that they are between and mate with the lips 19 of the annular member 18 and the lips 17 of the sun discs 14. The planet discs are mounted in such a way that they are capable of limited sliding movement along their axis of rotation so that at all times they remain normal to their axis of rotation. The sun discs 14 and the annular members 18 also remain in planes substantially normal to the axis of rotation.

Whilst the drive is in motion the sun discs 14 rotate with the input shaft 12 and through lips 17 impart a motion to the planet discs 24. As the outer parts of the planet discs 24 are frictionally engaged by the lips 19 of the non rotating annular members 18, the planet discs are caused to rotate around an axis coaxial with the input shaft at a speed lower than that of the input shaft and in the same direction. The motion of the planet discs is transferred to the carrier member 20 and hence to the output shaft 13 through forks 21 and shafts 22.

The ratio between the speed of the drive shaft 12 and the output shaft 13 is governed by the radial position of the planet discs 24 with respect to the sun discs 14 and the annular members 18. When the annular members 18 are moved apart so that the planet discs 24 move outwardly so that the centres of the planet discs 24 are close to the annular members 18 and the peripheries of the sun discs 14 are close to the peripheries of the planet discs 24 there is a maximum reduction in speed between input shaft 12 and output shaft 13 whilst the minimum reduction is obtained in the reverse position. A single stage as shown in FIGS. 1 and 2 of the drawings and as described above is capable of a stepless variation range of approximately 10:1 and has a high torque and power capacity. It is also simple to construct and has fewer parts than many conventional mechanical infinitely variable speed drives. Also there is no tilting of the planet discs as in known devices. The loading on the sun discs 14 produced by the springs 15 or torque sensitive axial loading device provides an axial force which allows a tangential frictional drive force to be maintained between the lips 17 of the sun discs 14 and the conical surfaces of the planet discs 24. The action of moving the lips 19 of the annular members 18 towards each other provides an axial force acting on the outer peripheries of planet discs 24 and by varying this force as required the relative radial position of the planet discs 24 can be varied as required to obtain the desired velocity ratio between input shaft 12 and output shaft 13.

Figure 3:
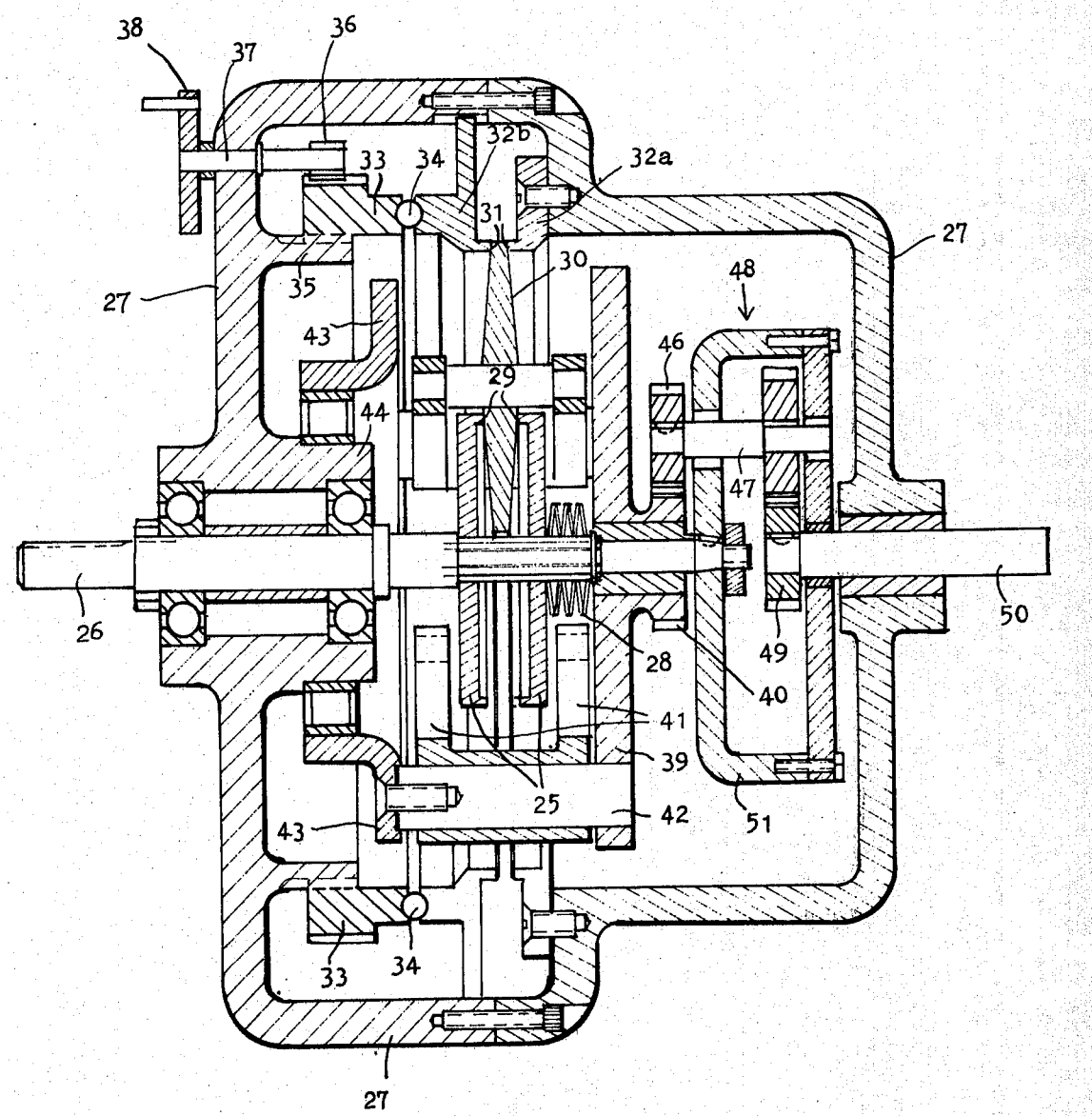
FIG. 3 is a sectional view of a second embodiment in which the infinitely variable speed drive is combined with an epicyclic gear system.
Figure 4:
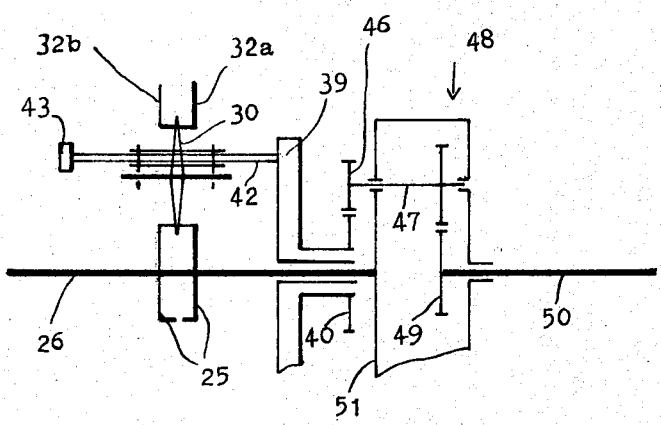
FIG. 4 is a schematic illustration of the system shown in FIG. 3.

The mechanism of the present invention is well suited for use in conjunction with an epicyclic gear system to permit a wide range of drive characteristics. One such system is shown in FIGS. 3 and 4 of the accompanying drawings. As shown in FIGS. 3 and 4 of the drawings a pair of sun discs 25 is mounted on the inner end of a drive shaft 26 to rotate therewith, the shaft 26 being rotatably mounted in one end of a casing or housing 27. The discs 25 are forced towards each other by means of spring 28, so that lips 29 provided on the outer ends of the discs 25 engage the faces of planet discs 30 as described in the previous embodiment. The planet discs 30 are located between lips 31 provided on annular members 32, and each are mounted on one end of forks or arms 41, the other ends of which are pivotally mounted on shafts 42, projecting from the carrier member 39. The ends of the shafts remote from the carrier member 39 are supported by a ring member 43 rotatably mounted on an inwardly projecting boss 44 in the casing for rotation about an axis coaxial with the axis of rotation of the carrier member. Preferably the planet discs are mounted in such a way that they are capable of limited sliding movement along their axis of rotation so that at all times they remain normal to the axis of rotation. One of the annular members 32A is fixed to the inside of the housing 27 whilst the other of the annular members 32B, which is held to prevent rotation thereof, bears against a ring gear 33 through thrust bearing 34. The ring gear 33 is internally threaded to mate with a similar thread provided on an internal projection 35 of the housing 27. The ring gear meshes with a pinion 36 carried on the inner end of a shaft 37 rotatably mounted on the casing 27. The outer end of the shaft 37 is fitted with a hand wheel 38. By rotating the hand wheel 38 in the desired direction the annular member 32B can be moved towards or away from the fixed annular member 32A whilst the input shaft 26 is in motion. The carrier 39 is provided with a gear 40 which meshes with gears 46 mounted on shafts 47 of the epicyclic gear train 48, the gear 49 of which is fixed to the input shaft 50. The carrier 39 is rotatably mounted on the inner end of the input shaft 26 which is extended to and coupled to the epicyclic gear train casing 51. With the mechanism the output shaft 50 can have an output speed range steplessly variable from a fixed maximum reverse speed relative to input shaft 26 through zero to a fixed maximum forward speed relative to input shaft 26. Thus this unit is very suitable for automotive, locomotive and many industrial uses.

Figure 5:
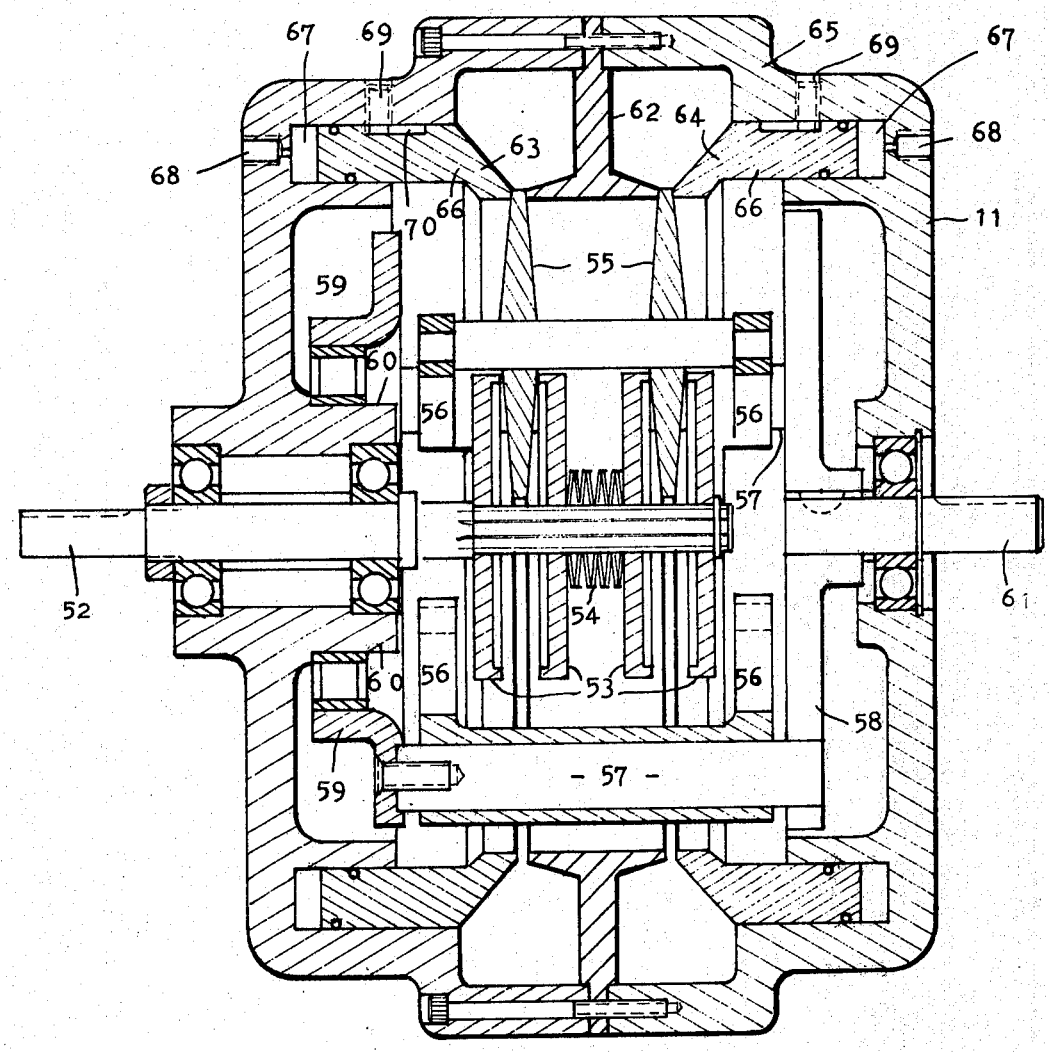
FIG. 5 is a sectional view of a third embodiment showing two epicyclic frictional drives of the present invention combined into a single unit.

In the embodiment shown in FIG. 5 of the drawings the input shaft 52 has two pairs of sun discs 53 mounted thereon. The outer of each pair of sun discs is fixed and the inner of each pair is urged towards the outer of the pair by means of spring 54. If desired the spring may be replaced by any known torque sensitive axial loading device. Each of the pair of sun discs engages a group of planet discs 55 each rotatably mounted on one end of a corresponding fork or arm 56 the other end of each of which is pivotally mounted on shafts 57 projecting from a carrier member 58. The ends of the shafts 57 remote from the carrier member 58 are supported on a ring member 59 rotatably mounted on an inwardly projecting boss 60 in the casing for rotation about an axis, coaxial with the axis of rotation of the carrier member 58 which is coupled to the output shaft 61 to rotate therewith. The planet discs 55 are each positioned between annular members 62, 63 or 62, 64. Preferably the planet discs are mounted in such a way that they are capable of limited sliding movement along their axis of rotation so that at all times they remain normal to the axis of rotation. The common annular member 62 is fixed to the inside of the casing 65 of the unit whilst the annular members 63 and 64 are coupled to or formed integral with piston members 66 slidably mounted in annular chambers 67 formed in the casing. Each chamber 67 is adapted to be connected to a supply of hydraulic fluid or compressed air through inlet 68. Pins 69 are mounted in the casing so that their inner ends engage in slots 70 formed in the piston members 66 to prevent rotation thereof. By duplicating the epicyclic friction drive as shown in FIG. 5 the torque capacity of the drive can be readily increased.

A further example of the coupling of the drive of the present invention with an epicyclic gear system is shown schematically in FIG. 6 of the drawings. In this embodiment the input shaft 71 is extended past the sun discs 72 to provide an input to an epicyclic gear set 73. The paired planet gears 74 of the epicyclic train 73 rotate on and are carried on a shaft 75 which is supported by a carrier member 76 and a ring member 77. Each of the arms or forks (on which the planet discs 78 of the epicyclic friction drive are mounted) is pivotally mounted on one of the shafts 75. The carrier member 76 is rotatably mounted on an output shaft 79 which is coupled to gear 80 of the epicyclic gear train which meshes with the gears 74. In this arrangement the speed variation of the output shaft 79 relative to the input shaft 71 may be made to be quite small to provide a drive for mechanisms which require very accurate speed settings over a small range.

Hitherto the invention has been described with reference to embodiments in which the radial position of the planet discs relative to the sun discs and the annular members has been varied by forcibly moving the annular members towards each other. With such an arrangement it is only practical to change the relative radial position of the planet discs whilst the drive is in motion. Other means for varying the relative radial position of the planet discs may be used. One such suitable means for varying the relative radial position of the planet discs comprises a member coaxially with the input shaft, provided with a frusto-conical recess positioned within the casing for sliding movement back and forth along the axis of rotation of the input and output shafts. One end of each shaft on which the planet discs are rotatably mounted is formed to a frusto-conical shape or fitted with a member formed to a frusto-conical shape which mates with the frusto conical recess. By moving the recess member axially the relative radial position of the planet discs can be varied as required. In this case the annular members are axially loaded by spring or hydraulic means so that they are forced towards each other to apply an axial force acting on the outer peripheries of the planet discs and are capable of moving apart as the radial position of the planet discs change.

With this means of varying the relative radial position of the planet discs it is possible to move the axis of rotation of the planet discs closer to the periphery of the sun discs whilst the input shaft is stationary.

The embodiments described above with reference to FIGS. 3, 4 and 6 are concerned with the combination of the speed drive mechanism with more or less complex epicyclic gear systems. The speed drive mechanism may be readily combined with a conventional single stage epicyclic gear train in three possible arrangements as is illustrated in FIGS. 7, 8 and 9 of the accompanying drawings.

In the embodiment illustrated in FIG. 7 of the accompanying drawings the annulus gear 81 of the single stage gear train is connected to the carrier member 82 of the speed drive mechanism whilst the fixed speed input shaft 83 of the speed drive mechanism is connected to the sun gear 84. The planet gear carrier 85 is connected to a final output shaft 86.

In the embodiment illustrated in FIG. 8 of the accompanying drawings the carrier member 92 of the speed drive mechanism is connected to the annulus gear 91 of the single stage gear train whilst the fixed speed input shaft 93 of the speed drive mechanism is connected to the planet gear carrier 94. A final output shaft 96 is connected to the sun gear 95.

In the embodiment illustrated in FIG. 9 of the accompanying drawings the carrier member 102 of the speed drive mechanism is connected to the planet gear carrier 104 of the single stage gear train whilst the fixed speed input shaft 103 of the speed drive mechanism is connected to the sun gear 105. A final output shaft 107 is connected to the annulus gear 101.

I claim:

1. An infinitely variable speed drive mechanism comprising a pair of sun discs mounted on a first shaft for rotation therewith and at least one of said discs being capable of limited axial movement along the shaft and being loaded towards each other, a plurality of planet discs each rotatably mounted on one end of a corresponding arm or fork for rotation about an axis substantially parallel to said first shaft, the other end of each arm or fork being pivotally mounted on a carrier member for movement about an axis substantially parallel to said first shaft, said planet discs moving in a plane normal to the axis of rotation, and being capable of limited sliding movement along their axis of rotation so that at all times they remain substantially normal to the axis of rotation, said carrier being mounted on a second shaft for rotation therewith about an axis coaxial with the axis of rotation of said first shaft, a pair of spaced non rotating annular members substantially coplanar with and concentric with said sun discs, the inner periphery of said annular members and the outer periphery of said sun discs embracing and frictionally engaging said planet discs and means for varying the radial position of said planet discs with respect to said annular members and said sun discs.

2. An infinitely variable speed drive mechanism as claimed in claim 1 combined with at least one epicyclic gear train.

3. An infinitely variable speed drive mechanism comprising a pair of sun discs mounted on a first shaft for rotation therewith and at least one of said discs being capable of limited axial movement along the shaft and being loaded towards each other, a plurality of planet discs each rotatably mounted on one end of a corresponding arm or fork for rotation about an axis substantially parallel to said first shaft, the other end of each arm or fork being pivotally mounted on a carrier member for movement about an axis substantially parallel to said first shaft, said planet discs moving in a plane normal to the axis of rotation and being capable of limited sliding movement along their axis of rotation so that at all times they remain substantially normal to the axis of rotation. Said carrier being mounted on a second shaft for rotation about an axis coaxial with the axis of rotation of said first shaft, a pair of spaced non rotating annular members substantially coplanar with and concentric with said sun discs, the inner periphery of said annular members and the outer periphery of said sun discs embracing and frictionally engaging said planet discs and means for varying the radial position of said planet discs with respect to said annular members and said sun discs, and an epicyclic gear train comprising a casing, an input sun gear, an output sun gear and planet gears wherein said first shaft is connected to the casing of the epicyclic gear train, the rotation of the carrier member is transmitted to the planet gears of the epicyclic gear train located within the casing and the second shaft is connected to the output sun gear of the epicyclic gear train.

4. An infinitely variable speed drive mechanism comprising a pair of sun discs mounted on a first shaft for rotation therewith and at least one of said discs being capable of limited axial movement along the shaft and being loaded towards each other, a plurality of planet discs each rotatably mounted on one end of a corresponding arm or fork for rotation about an axis substantially parallel to said first shaft, the other end of each arm or fork being pivotally mounted on a carrier member for movement about an axis substantially parallel to said first shaft, said planet discs moving in a plane normal to the axis of rotation and being capable of limited sliding movement along their axis of rotation so that at all times they remain substantially normal to the axis of rotation, said carrier member being rotatably mounted on said first shaft for rotation about an axis coaxial with the axis of rotation of said first shaft, a pair of spaced non rotating annular members substantially coplanar with and concentric with said sun discs, the inner periphery of said annular members and the outer periphery of said sun discs embracing and frictionally engaging said planet discs and means for varying the radial position of said planet discs with respect to said annular members and said sun discs, and an epicyclic gear train comprising a casing, an input sun gear, an output sun gear and two groups of planets, one group meshing with the input sun gear and the other group meshing with the output sun gear, the said first shaft of the epicyclic friction drive being connected to the casing, said carrier member being connected to the input sun gear and a second or output shaft being connected to the output sun gear.

5. An infinitely variable speed friction drive mechanism comprising two pair of sun discs mounted on a first shaft in spaced positions for rotation therewith, the outer sun disc of each pair being fixed and the inner sun disc of each pair being mounted for axial movement along said first shaft, spring means positioned between said inner sun discs to urge each inner sun disc towards the corresponding outer sun disc, a plurality of pairs of planet discs each pair being rotatably mounted on a shaft supported between the outer ends of a pair of arms or forks the inner ends of the pair of arms or forks being pivotally mounted on a carrier member for rotation about an axis substantially parallel to said first shaft, said planet discs moving in a plane normal to the axis of rotation and being capable of limited sliding movement along their axis of rotation so that at all times they remain substantially normal to the axis of rotation, said carrier member being mounted on a second shaft for rotation about an axis coaxial with the axis of rotation of said first shaft, three spaced non rotating annular members substantially coplanar with and concentric with said sun discs, the inner periphery of said annular members and the outer periphery of said sun discs embracing and frictionally engaging said planet discs, the inner of the three annular members being fixed and located between the pairs of planet discs and each of the outer members of the three annular members being located on the outside of the adjacent planet disc and slidable towards and away from the inner annular member whereby the radial position of said planet discs with respect to said annular members and said sun discs can be varied.

6. An infinitely variable speed drive mechanism comprising the combination of the friction drive mechanism as claimed in claim 1 and an epicyclic gear train comprising a gun gear, an annular gear and at least one planet gear connecting said sun gear and said annular gear wherein said first shaft of the friction drive is connected to one of the gears of the epicyclic gear train and an output shaft connected to one of the other gears of the epicyclic gear train.

7. An infinitely variable speed drive mechanism comprising the combination of the friction drive mechanism as claimed in claim 5 and an epicyclic gear train comprising a sun gear, an annular gear and at least one planet gear connecting said sun gear and said annular gear wherein said first shaft of the friction drive is connected to one of the gears of the epicyclic gear train and an output shaft connected to one of the other gears of the epicyclic gear train.

8. An infinitely variable speed drive mechanism comprising the combination of the friction drive mechanism as claimed in claim 5 and an epicyclic gear train comprising a casing, an input sun gear, an output sun gear and planet gears wherein said first shaft of the friction drive is connected to the input of sun gear of the epicyclic gear train, the rotation of the carrier member of the friction drive is transmitted to the planet gears of the epicyclic gear train located within the casing and the second shaft of the friction drive is connected to the output sun gear of the epicyclic gear train.

9. An infinitely variable speed drive mechanism comprising the combination of an epicyclic friction drive and an epicyclic gear train; said epicyclic friction drive comprising two pair of sun discs mounted on a first shaft in spaced positions for rotation therewith, the outer sun discs of each pair being fixed and the inner sun disc of each pair being mounted for axial movement along said first shaft, spring means positioned between said inner sun discs to urge each inner sun disc towards the corresponding outer sun disc, a plurality of pairs of planet discs each pair being rotatably mounted on a shaft supported between the outer ends of a pair of arms or forks the inner ends of the pair of arms or forks being pivotally mounted on a carrier member for rotation about an axis substantially parallel to said first shaft, said planet discs moving in a plane normal to the axis of rotation and being capable of limited sliding movement along their axis of rotation so that at all times they remain substantially normal to the axis of rotation, said carrier member being rotatably mounted on said first shaft for rotation about an axis coaxial with the axis of rotation of said first shaft, three spaced non rotating annular members substantially coplanar with and concentric with said sun discs, the inner periphery of said annular members and the outer periphery of said sun discs embracing and frictionally engaging said planet discs, the inner of the three annular members being fixed and located between the pairs of planet discs and each of the outer members of the three annular members being located on the outside of the adjacent planet disc and slidable towards and away from the inner annular member whereby the radial position of said planet discs with respect to said annular members and said sun discs can be varied; and said epicyclic gear train comprising a casing, an input sun gear, an output sun gear and two groups of planet gears, one group of planet gears meshing with the input sun gear and the other group of planet gears meshing with the output sun gear; the said first shaft of the friction drive being connected to the casing of the epicyclic gear train, said carrier member of the friction drive being connected to the input sun gear and a second or output shaft being connected to the output sun gear.

* * * * *